US005127694A

United States Patent [19]

Oehninger

[11] Patent Number: 5,127,694

[45] Date of Patent: Jul. 7, 1992

[54] VACUUM MANIPULATOR

[75] Inventor: Jean E. Oehninger, Yverdon-Les-Bains, Switzerland

[73] Assignee: The Triangle Tool Group, Orangeburg, S.C.

[21] Appl. No.: 733,063

[22] Filed: Jul. 17, 1991

Related U.S. Application Data

[63] Continuation of Ser. No. 491,411, Mar. 3, 1990, abandoned.

[51] Int. Cl.[5] ........................ B25J 15/06; F16K 3/314; F16K 35/04

[52] U.S. Cl. ............................... 294/64.1; 137/625.25; 251/297; 251/321; 251/347; 251/348

[58] Field of Search ............................. 294/64.1-64.3; 15/419, 421; 137/625.25; 251/145, 297, 318-322, 347, 348; 604/119, 129

[56] References Cited

U.S. PATENT DOCUMENTS 2,777,462 1/1957 Hohnstein ........................ 251/297 X
3,071,402 1/1963 Lasto et al. .................... 294/64.1 X
3,455,533 7/1969 Epp .................................... 251/145
3,834,388 9/1974 Sauer et al. ........................ 15/421 X
3,843,183 10/1974 Hutson ............................... 294/64.1
4,522,592 6/1985 Johnson .......................... 251/348 X
4,618,178 10/1986 Hutson et al. ...................... 294/64.1

FOREIGN PATENT DOCUMENTS 1086685 2/1955 France ................................ 15/421

*Primary Examiner*—Johnny D. Cherry
*Attorney, Agent, or Firm*—Harness, Dickey & Pierce

[57] ABSTRACT

A vacuum manipulator having a spool valve mounted in a sliding fashion in a guide channel at the bottom of which are two holes in communication with two duct segments with one segment intended to be connected to a suction source, and a longitudinal guide channel connected to the spool valve for placing the holes in communication with the atmosphere, and a bearing surface of the spool valve with the bottom of the guide channel being limited to three zones which provide a high specific vacuum while also providing a large seating and guide area, and the spool valve being movable against the pressure applied by a spring between a front span and a back stop which may also define a third locking position.

3 Claims, 1 Drawing Sheet

VACUUM MANIPULATOR

This is a continuation of U.S. patent application Ser. No. 491,411, filed Mar. 3, 1990, now abandoned.

BACKGROUND OF THE INVENTION

The present invention concerns a vacuum manipulator comprising an elongated body with two segments of longitudinal ducts, one of which opens at one end of said body and is intended to be connected to a suction source and the other, one of which is intended to be fitted with a suction nozzle. The internal ends of these duct segments communicate laterally via respective holes with the bottom of the longitudinal guide channel. The guide channel constitutes the seat of a spool valve mounted in a longitudinal fashion and sliding in this guide channel.

The U.S. Pat. No. -A-3,843,183 patent already describes such an instrument equipped with a sliding spool valve. The problem which exists with such a valve is that of the air tightness existing between the bottom of the guide channel, which constitutes the seat of the valve, and the surface of this valve in contact with this valve. When a vacuum is applied at the level of the hole which puts the seat of the valve in communication with the suction source, the valve is applied against said seat with a force corresponding to the vacuum. Of course, the specific pressure is all the higher than the bearing surface is smaller; a lower limit should not, however, be exceeded to avoid the development of leaks. Furthermore, the length and the width of the valve should be sufficient to ensure the guide and stability of this sliding part. For reasons of weight and price, the body of this instrument as well as the spool valve are preferably made out of molded plastic. It results from these various data that it is practically extremely difficult, if not impossible, to manufacture a valve long and wide enough and to obtain simultaneously a good airtightness between said valve and its seat, since the specific pressure is too low and it is impossible to ensure a perfect contact over the whole surface especially with plastic parts.

The goal of this invention is to remedy, partly at least, the hereabove-mentioned disadvantages by ensuring at once a good guide function and a good air tightness of the spool valve.

The instrument, according to the invention, is of a simple construction, of a reliable operation and an easy manipulation. Many other advantages will appear during the description accompanying the appended drawing which illustrates, schematically and as an example, a form of execution of the instrument which is the object of the present invention.

Other objects, features, and advantages of the present invention will become apparent from the subsequent description and the appended claims, taken in conjunction with the accompanying drawings, in which:

Figure 1:
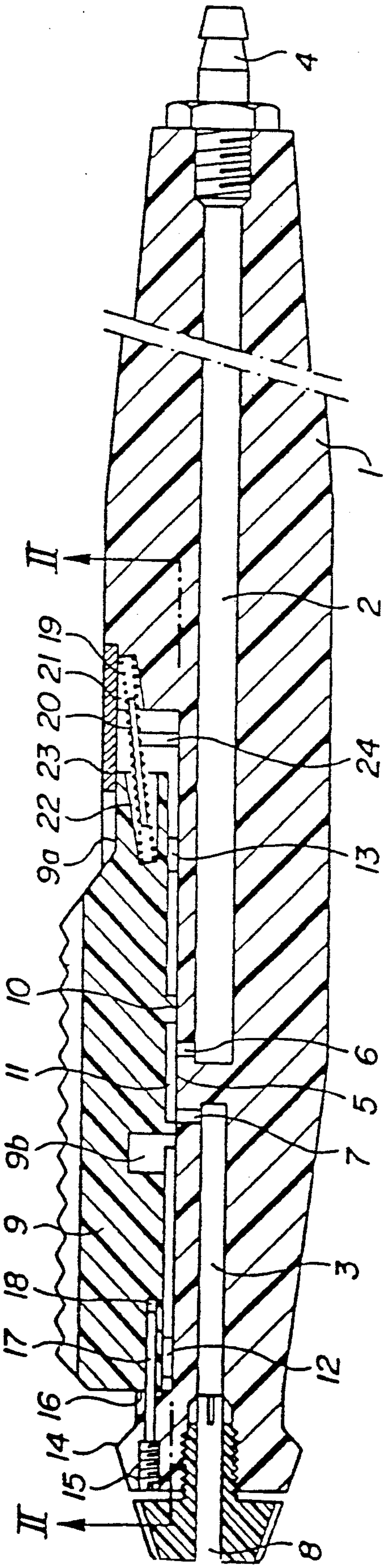
FIG. 1 is an axial cross-sectional view of this form of execution.

This instrument is comprised of an elongated body 1 constituted by a molded plastic part, which presents to segments of axial ducts 2 and 3. The duct segment 2 opens on the back end of the body 1 of the instrument and is equipped with a connection nozzle 4 intended to receive a flexible hose linking duct segment 2 to a suction source (not illustrated). The other end of this segment is placed in communication with the flat bottom of a guide channel 5 via a hole 6. The internal end of the other duct segment 3 is also put in communication with the flat bottom of this guide channel 5 by means of a hole 7, while its other end opens on the front part of the body 1 of the instrument and is equipped with a clamping chuck 8 intended for the movable fitting of a diversity of tubular suction nozzles (not illustrated).

A spool valve 9 in the shape of a slide is mounted in a sliding fashion in the guide channel 5. It has on its lower face adjacent to the bottom of the guide channel 5, which constitutes the seat of this valve 9, three distinct zones, elevated in relation to this face. They are: a central zone 10 in the shape of an endless wall creating an enclosed space 11 constituting the spool of this valve 9, and two zones 12 and 13 placed close to the ends of this valve, to prevent the tilting of valve 9 around the central elevated zone 10. Each of the elevated zones 12, 13 is divided into two parts which create between themselves a communication hole with the outside atmosphere. A blind hole **9*b* is pierced in the valve 9 in part on the front edge of the elevated wall 10**.

A ring-shaped boss 14 is formed around the front end of the body 1 of the instrument and serves as a front bearing surface for the fingers of the user of the instrument. A drilled hole 15 whose front part is threaded crosses this boss 14 in a fashion parallel to the axis of the body 1 and opens in a span 16 formed by the front end of the guide channel 5. A rod 17 with a threaded end engages drilling 15 and penetrates into a corresponding drilling 18 which exists in the front end of valve 9. The threaded part of this rod 17 is screwed into the threaded part of drilling 15.

A spring 19 mounted on a rod 20 shorter than it is lodged in part in a clearance space 21 left at the back end of the channel 5 and in an enclosure 22 opening at the back end of valve 9. A plate 23, fixed by means of a screw (not illustrated) on body 1, covers the back end of channel 5. The back end of valve 9 ends in a part of reduced height **9*a* which can slide under plate 23**.

The rod 17 and plate 23 are used to keep the spool valve 9 in the channel 5 in the absence of vacuum. The plate 23 serves also to keep spring 19 in clearance space 21.

Figure 2:
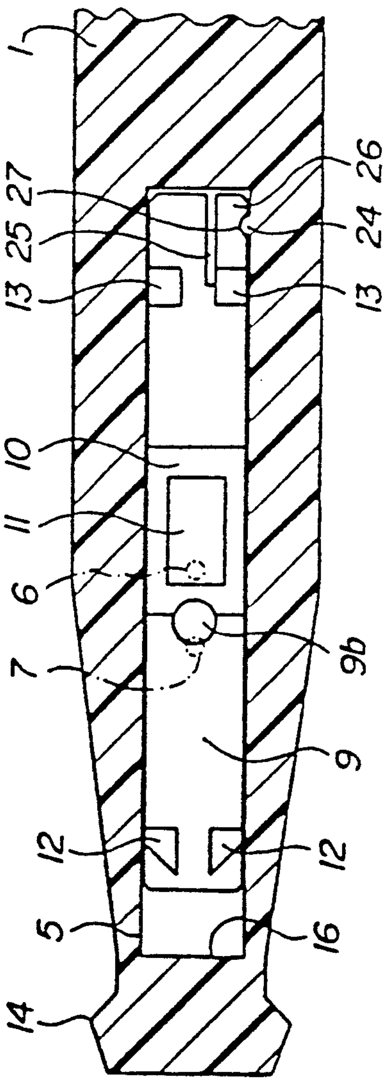
FIG. 2 is a cross-sectional view according to II—II of FIG. 1.

As can be seen in particular in FIG. 1, a vertical stop is formed by a ribbing or groove 24 which protrudes from one of the side walls of the guide channel 5. FIG. 2 shows the spool valve from underneath. It can be seen on this figure that a slot 25 extends longitudinally at the end of the spool valve 9. This slot 25 is not located in the middle of the width of valve 9, so as to form an elastic arm 26. This arm 26 has a notch 27 intended to engage in the ribbing or groove 24. The corner formed at the free end of this arm 26, which is adjacent to the side wall of the guide channel 5, is slightly chamfered whereas the ribbing or groove 24 is semi-cylindrical in section so that the force exerted on valve 9 to push it towards the back is transformed into a force with a transversal component which applies itself on the elastic arm 26 when the back end of the valve 9 meets with the ribbing or groove 24, allowing thus to engage notch 27 on ribbing 24, when a sufficient force is applied on the spool valve 9.

In the position illustrated by FIG. 1, the spool valve 9 is pushed against span 16, limiting the guide channel towards the front by means of the spring 19. As may be observed on this FIG. 1, the enclosed space 11 created inside the endless wall and forming the central elevated zone 10 is in communication with holes 6 and 7 and consequently, the source of suction connected to the duct segments 2 and 3. As a consequence, the nozzle which will be fastened to the front part of the body 1 in the clamping chuck 8 will be subjected to a vacuum and will be able to seize electronics, electrical or small mechanical parts or components, for instance.

When the part or component thus seized is brought to the proper location for mounting or fastening, the user, holding the body of the instrument as he would a pencil with the forefinger placed on the notched upper surface of the valve 9, moves the latter in its guide channel 5 until its back end meets with ribbing 24. As it passes from the forward position to the back position, unstable and bearing elastically against ribbing 24, the hole 7 goes from the inside 11 of the zone 10 to the outside in front of the blind hole 9*b*. The role of the blind hold 9*b* is to essentially to decrease the travel required of valve 9 when going from one position to the other position by reducing only locally and progressively the thickness of the wall of zone 10 surrounding space 11. In this second position, the duct segment 3 is immediately placed at the atmospheric pressure, liberating thus the part or component which was being held by the vacuum.

In order to go and seize another part, it is only necessary to free the spool valve 9 which is automatically returned against span 16 by spring 19, re-establishing thus the vacuum in the duct segment 3.

During prolonged interruption in the use of this instrument, one only needs to apply on valve 9, which is resting against ribbing 24, a force capable of flexing elastically the arm 26 in order to bring the groove 27 in connection with the ribbing 24, maintaining thus the hole 6 of the duct segment 2 in the closed space 11 of the spool 9 and separated from the hole 7 which remains in communication with the atmosphere.

One notices the very great simplicity on the activating mechanism of this instrument as well as the low number of parts which reduces the assembly cost. The main parts, the body 1 and the slide of the spool 9 are obtained essentially by molding plastic. The tests carried out have shown that it was possible to obtain at the exit of the instrument a vacuum in excess of 80% of that of the suction source. The operation is silent. Only one finger is used to shift via a simple sliding motion the spool valve 9 between three distinct positions, which makes this instrument very easy to operate.

I claim:

1. A vacuum manipulator, comprising an elongated body with two segments of longitudinal ducts, one of which opens at one end of said body for connection to a suction source and the other one of which is adapted to be fitted with a suction nozzle, said duct segments having internal ends communicating laterally via respective holes with the bottom of a longitudinal guide channel, a spool valve mounted for sliding in said longitudinal guide channel, said bottom of said guide channel defining a seat for said spool valve, said bottom of said channel being flat, said valve having a face adjacent to said bottom, said valve having three contact zones extending transversely from said face and adapted to engage said bottom of said channel for locating said face in space relationship to said bottom of said channel, one of said contact zones being generally centrally located on said spool valve and being formed by an endless wall which defines an enclosed space and the other two of said zones being located at opposite ends of said spool valve and at least one of said other two zones comprising parts defining an opening which communicates with the atmosphere and is adapted to selectively communicate said other one of said ducts to the atmosphere with said spool valve in a non-pickup position, and a first means for biasing said spool valve in a first direction, said first means being operable to slide said spool valve towards a pickup position, and a second means for selectively preventing said first means from sliding said valve to said pickup position.

2. The vacuum manipulator according to claim 1, wherein said guide channel is closed at both ends, said first means comprising an elastic return element located between a back end of said spool valve and a rear end of said channel, said return element elastically urging said spool valve against a span located at a front end of said spool valve, a clearance space being located at a back end of said spool valve adjacent to said guide channel wherein said elastic return element is located in part in said clearance space, said second means comprising a ribbing protruding from said guide channel and a second elastic element having a notch intending to engage in said ribbing to prevent said first means from sliding said valve to said pickup position, said valve subjectable to a force and said force also being applied against second elastic element thereby causing said valve to be slidable to a position whereby said notch on said second elastic element engages said ribbing.

3. The vacuum manipulator according to claim 1, with said spool valve being held in said channel on the one hand by a rod extending longitudinally at a forward end of said channel mounted and sliding in a guide duct located at a forward end of said spool valve and, on the other hand, by a plate member which covers part of a back end of said channel under which part of said back end of said spool valve is engaged in a sliding fashion.

* * * * *